United States Patent
Bryan, III

(10) Patent No.: US 10,791,687 B2
(45) Date of Patent: Oct. 6, 2020

(54) HYDROPONIC PLANT CULTIVATING APPARATUS

(71) Applicant: Tower Garden, LLC, Collierville, TN (US)

(72) Inventor: Morris Bryan, III, Greer, SC (US)

(73) Assignee: TOWER GARDEN, LLC, Collierville, TN (US)

( * ) Notice: Subject to any disclaimer, the term of this patent is extended or adjusted under 35 U.S.C. 154(b) by 0 days.

(21) Appl. No.: 16/240,982

(22) Filed: Jan. 7, 2019

(65) Prior Publication Data

US 2019/0133061 A1 May 9, 2019

Related U.S. Application Data

(63) Continuation of application No. 15/235,192, filed on Aug. 12, 2016, now Pat. No. 10,206,344.
(Continued)

(51) Int. Cl.
*A01G 31/02* (2006.01)
*A01G 9/02* (2018.01)
(Continued)

(52) U.S. Cl.
CPC ............ *A01G 31/02* (2013.01); *A01G 9/023* (2013.01); *A01G 31/06* (2013.01); *A01G 27/005* (2013.01); *Y02P 60/21* (2015.11)

(58) Field of Classification Search
CPC ....... Y02P 60/216; A01G 9/022; A01G 9/023; A01G 31/02; A01G 2031/006
See application file for complete search history.

(56) References Cited

U.S. PATENT DOCUMENTS

| 875,235 A | 12/1907 | Bastel |
| 2,205,303 A * | 6/1940 | Munsell ................. A01G 31/02 47/63 |

(Continued)

FOREIGN PATENT DOCUMENTS

| CN | 201624046 U | 11/2010 |
| CN | 203105262 U | 8/2013 |

(Continued)

OTHER PUBLICATIONS

International Search Report, dated May 12, 2016, three pages.

*Primary Examiner* — Richard G Davis
(74) *Attorney, Agent, or Firm* — Eric B. Fugett; Mark A. Pitchford; Pitchford Fugett, PLLC

(57) ABSTRACT

A hydroponic plant cultivation apparatus including a reservoir having a base defining a first portion of the reservoir and a cover defining a second portion of the reservoir. An upper opening is defined in the cover. A planting column with a hollow interior is positioned above the upper opening. At least one planting port is defined in the planting column. A conduit can pass through the hollow interior of the planting column, the conduit fluidly communicated with the reservoir. A fluid distributor is positioned atop the planting column, the fluid distributor in fluid communication with the conduit. Fluid is selectively circulated from the reservoir through the conduit in the planting column to the fluid distributor, where the fluid is redirected down the hollow interior of the planting column and back to the reservoir. A hydroponic plant cultivation apparatus including a reservoir positioned on a plurality of rollers.

2 Claims, 16 Drawing Sheets

Related U.S. Application Data

(60) Provisional application No. 62/243,767, filed on Oct. 20, 2015.

(51) Int. Cl.
*A01G 31/06* (2006.01)
*A01G 27/00* (2006.01)

(56) References Cited

U.S. PATENT DOCUMENTS

| | | | |
|---|---|---|---|
| 4,006,559 A | 2/1977 | Carlyon, Jr. | |
| 4,033,072 A | 7/1977 | Kobayashi et al. | |
| 247,165 A | 2/1978 | Hart | |
| 4,218,847 A | 8/1980 | Leroux | |
| 262,274 A | 12/1981 | Lahr | |
| 278,614 A | 4/1985 | Moss | |
| 4,736,543 A * | 4/1988 | von Bertrab Erdmann | A01G 9/023 47/82 |
| 4,756,120 A | 7/1988 | Arledge | |
| 4,918,861 A | 4/1990 | Carpenter et al. | |
| 4,986,027 A | 1/1991 | Harvey | |
| 5,276,997 A | 1/1994 | Swearengin et al. | |
| 5,309,670 A * | 5/1994 | Bates | A47G 7/02 248/346.11 |
| 5,363,594 A | 11/1994 | Davis | |
| 5,438,797 A | 8/1995 | Lendel | |
| 5,440,836 A * | 8/1995 | Lee | A01G 31/06 47/59 R |
| 5,555,676 A | 9/1996 | Lund | |
| 5,819,469 A * | 10/1998 | Hsu | A01G 9/04 47/39 |
| 6,128,853 A * | 10/2000 | Klonel | A01G 9/02 47/39 |
| 6,209,891 B1 * | 4/2001 | Herrmann | B44D 3/14 280/32.6 |
| 6,408,570 B1 | 6/2002 | Shih et al. | |
| 6,477,805 B2 | 11/2002 | Ware | |
| 7,055,282 B2 | 6/2006 | Bryan, III | |
| 2003/0213170 A1 * | 11/2003 | Snead | A01G 31/02 47/62 A |
| 2006/0032128 A1 * | 2/2006 | Bryan, III | A01G 9/022 47/62 R |
| 2006/0248797 A1 * | 11/2006 | White | A01G 9/02 47/66.6 |
| 2011/0005131 A1 * | 1/2011 | Smits | A01G 7/02 47/79 |
| 2014/0223818 A1 * | 8/2014 | Coghlan | A01G 31/02 47/62 R |
| 2016/0100535 A1 * | 4/2016 | Daugirdas | A01G 31/06 47/62 E |
| 2017/0258015 A1 * | 9/2017 | Cudmore | C05F 17/95 |
| 2017/0318752 A1 * | 11/2017 | Pence | A01G 9/023 |
| 2017/0354096 A1 | 12/2017 | Xing | |

FOREIGN PATENT DOCUMENTS

| | | |
|---|---|---|
| CN | 104025996 A | 9/2014 |
| CN | 204579388 U | 8/2015 |
| EP | 0301362 A1 | 1/1989 |
| GB | 2147484 A | 5/1985 |
| JP | 5232929 B1 | 7/2013 |

* cited by examiner

HYDROPONIC PLANT CULTIVATING APPARATUS

CROSS-REFERENCES TO RELATED APPLICATIONS

This application is a continuation of U.S. patent application Ser. No. 15/235,192, filed Aug. 12, 2016 and entitled "HYDROPONIC PLANT CULTIVATING APPARATUS," which issued as U.S. Pat. No. 10,206,344 on Feb. 19, 2019, and which claims priority benefit of U.S. Provisional Patent Application Ser. No. 62/243,767 filed Oct. 20, 2015 entitle IMPROVED HYDROPONIC PLANT CULTIVATING APPARATUS, both of which are hereby incorporated herein by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to hydroponic devices for plant cultivation, or plant cultivation systems that use nutrient rich water which may also be referred to as tonic to grow plants, as opposed to using soil.

More particularly, the present disclosure relates to an improved hydroponic cultivation system. An example of a conventional hydroponic cultivation system can be seen in U.S. Pat. No. 7,055,282 to Bryan, which is incorporated by reference herein in its entirety. In conventional hydroponic plant cultivation systems, a reservoir holds the nutrient rich water which is pumped to the top of a planting column where the water is directed back downward on the roots of plants contained within the planting column. In conventional systems, the reservoir that held the nutrient rich water typically had a flat cover and a generally square, rectangular, or cylindrical shape. Water contained in reservoirs of such shapes can distribute heat unevenly and as such uneven temperature distributions can be produced throughout the nutrient rich water.

Plant nutrients contained in the water for hydroponic plant cultivation systems can have optimal storage temperatures and conditions which can help prolong the life and efficacy of the nutrients being used in the cultivation system. Inconsistent temperature distribution throughout the reservoir could produce hot or cold spots in the reservoir which can adversely affect the nutrients if the temperature of the water in the hot and cold spots of the reservoir falls outside of the nutrient's optimal storage conditions. Improper storage conditions could adversely affect the useful life and efficacy of the nutrients, which could in turn affect plant growth within the cultivation system.

Another problem with conventional hydroponic plant cultivation systems is that lids or covers for reservoirs in the hydroponic systems are generally flat. As such, as the system is run and humidity builds up in the reservoir between the fluid and the lid or cover, moisture can form on the lid or cover, which can cause mold to form inside the reservoir. Mold inside the reservoir can affect the quality of the nutrients in the system and may also require the reservoir to be cleaned. To clean the reservoir the planting column would need to be removed from the reservoir and the flow of water to the plants would have to be stopped, which is undesirable as the supply of nutrients to the plants is interrupted.

Another problem with conventional hydroponic plant cultivation systems is that they are difficult to move or relocate. Conventional systems are required to be lifted in order to move the systems to a different location. During the relocation process, water can remain in the reservoir and can add substantial weight which would have to be lifted in addition to the weight of the apparatus itself. In some systems, the weight of the water can be so burdensome that the nutrient rich water must be removed in order to lift and relocate the system, which results in a waste of nutrient rich water. Otherwise, the operator would have to wait until the water was depleted to a manageable weight before moving the system. Additionally, in conventional solutions, if the hydroponic system were to be lifted with water remaining in the reservoir, the water could shift during the relocation process and potentially spill from the reservoir, again wasting the nutrient rich water in the reservoir.

What is needed then are improvements to hydroponic plant cultivation systems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a hydroponic plant cultivation apparatus including a reservoir for holding fluid, the reservoir having a base and a cover, the base defining a first portion of the reservoir, and the cover defining a second portion of the reservoir. An upper opening can be defined in the cover. A planting column having a hollow interior can be positioned above the upper opening in the cover of the reservoir. At least one planting port can be defined in the planting column, the planting port configured to receive plants at least partially into the hollow interior of the planting column. A conduit can pass through the hollow interior of the planting column, the conduit fluidly communicated with the reservoir. A fluid distributor can be positioned atop the planting column, the fluid distributor in fluid communication with the conduit. Fluid can be selectively circulated from the reservoir through the conduit in the planting column and into the fluid distributor, where the fluid is redirected down the hollow interior of the planting column and back to the reservoir. In some embodiments, the cover can arch upward from the base and have rounded walls, the cover converging to the upper opening.

Another aspect of the present disclosure is a hydroponic plant cultivation apparatus including a reservoir for holding fluid. The apparatus can include a plurality of rollers, the reservoir position on the plurality of rollers. A planting column can have a hollow interior, the planting column positioned above the reservoir. At least one planting port can be defined in the planting column for receiving plants at least partially into the hollow interior of the planting column; a conduit passing through the hollow interior of the planting column, the conduit fluidly communicated with the reservoir. A fluid distributor can be positioned atop the planting column, the fluid distributor in fluid communication with the conduit. Fluid can be selectively circulated from the reservoir through the conduit in the planting column to the fluid distributor, where the fluid is redirected down the hollow interior of the planting column and back to the reservoir.

One objective of the present disclosure is to help maintain the temperature of water or fluid in a reservoir of a hydroponic plant cultivation apparatus.

Another objective of the present disclosure is to help ease the process of moving or relocating a hydroponic plant cultivation apparatus.

Another objective of the present disclosure is to provide improved sealing characteristics between a reservoir and a conduit in the planting column of a hydroponic plant cultivation apparatus.

Numerous other objects, advantages and features of the present disclosure will be readily apparent to those of skill in the art upon a review of the following drawings and description of a preferred embodiment.

DETAILED DESCRIPTION

Figure 1:
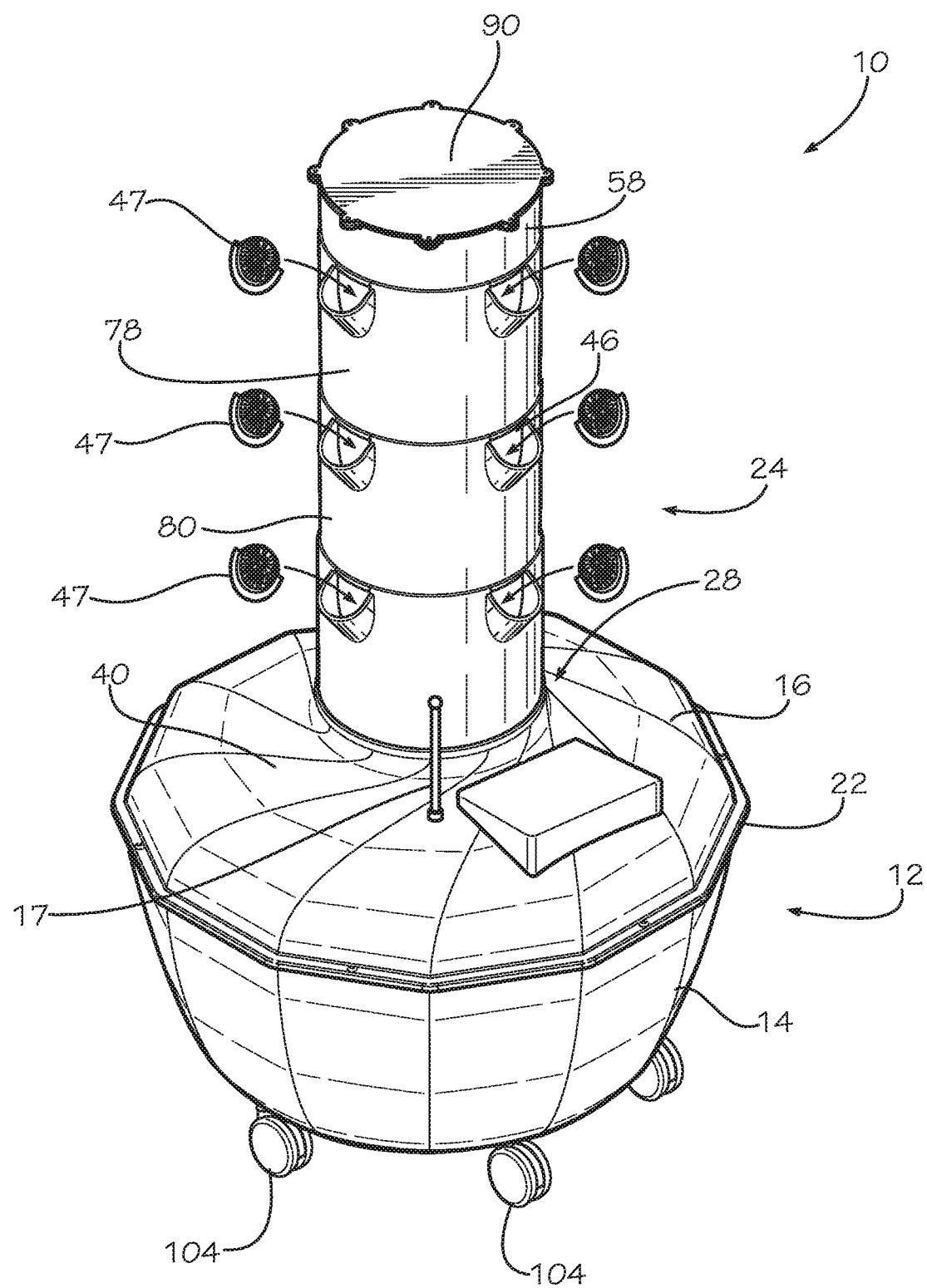
FIG. 1 is a perspective view of an embodiment of a hydroponic plant cultivation apparatus of the present disclosure.

While the making and using of various embodiments of the present invention are discussed in detail below, it should be appreciated that the present invention provides many applicable inventive concepts that are embodied in a wide variety of specific contexts. The patentable scope of the invention is defined by the claims, and may include other examples that occur to those skilled in the art. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

In the drawings, not all reference numbers are included in each drawing, for the sake of clarity. In addition, positional terms such as "upper," "lower," "side," "top," "bottom," "horizontal," "vertical," etc. refer to the apparatus when in the orientation shown in the drawing. A person of skill in the art will recognize that the apparatus can assume different orientations when in use.

Figure 2:
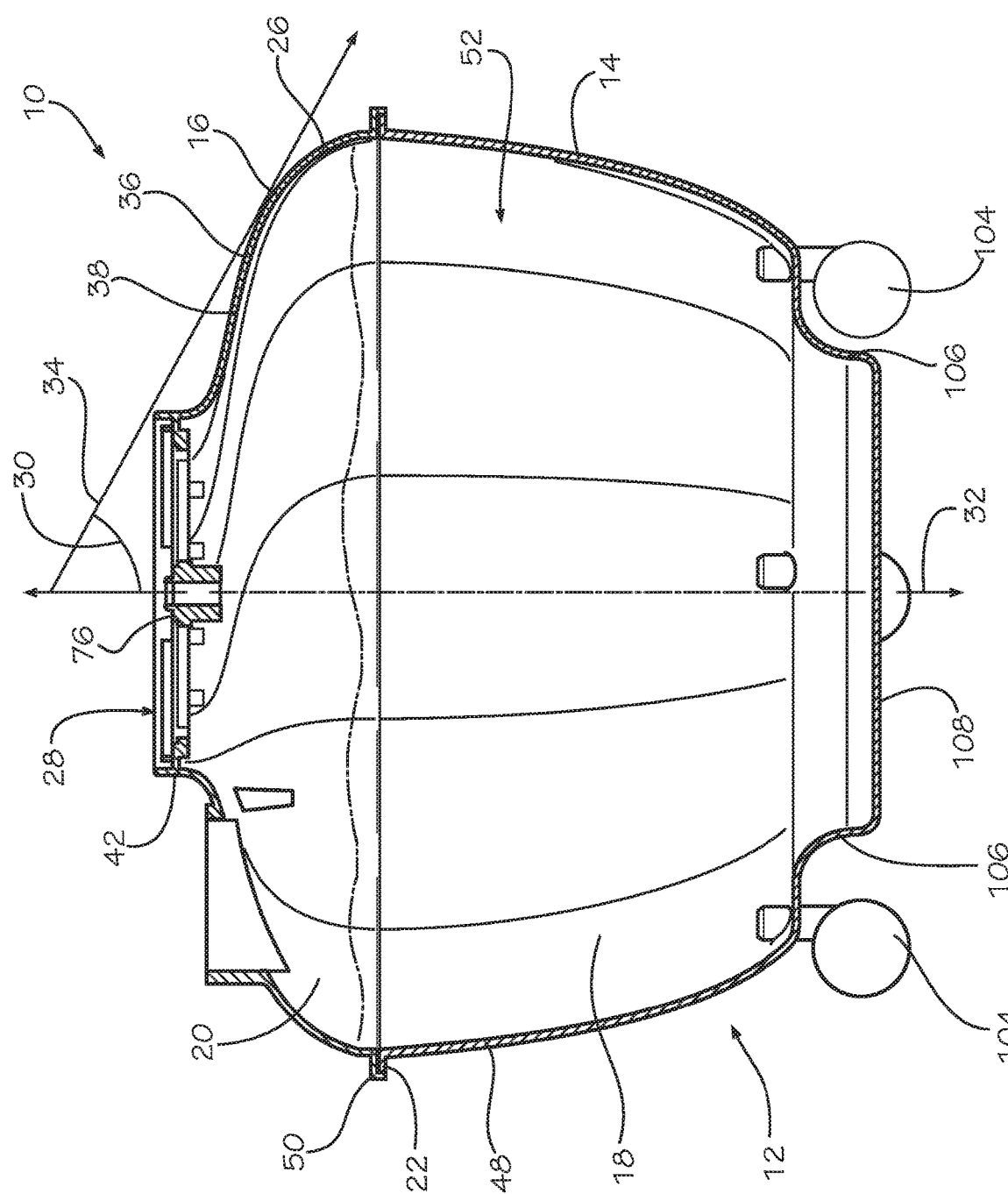
FIG. 2 is a cross section view of the reservoir of the hydroponic plant cultivation apparatus of FIG. 1.

An embodiment of a hydroponic plant cultivation apparatus 10 is shown in FIGS. 1-4. Apparatus 10 can include a reservoir 12 having a base 14 and a cover 16. Base 14 can define a first portion 18 of reservoir 12, and cover 16 can define a second portion 20 of reservoir 12, as shown in FIG. 2. As such, cover 16 can generally extend upward from base 14, and cover 16 in some embodiments can extend upward from a top edge 22 of base 14 to define second portion 20 of reservoir 12.

Figure 13:
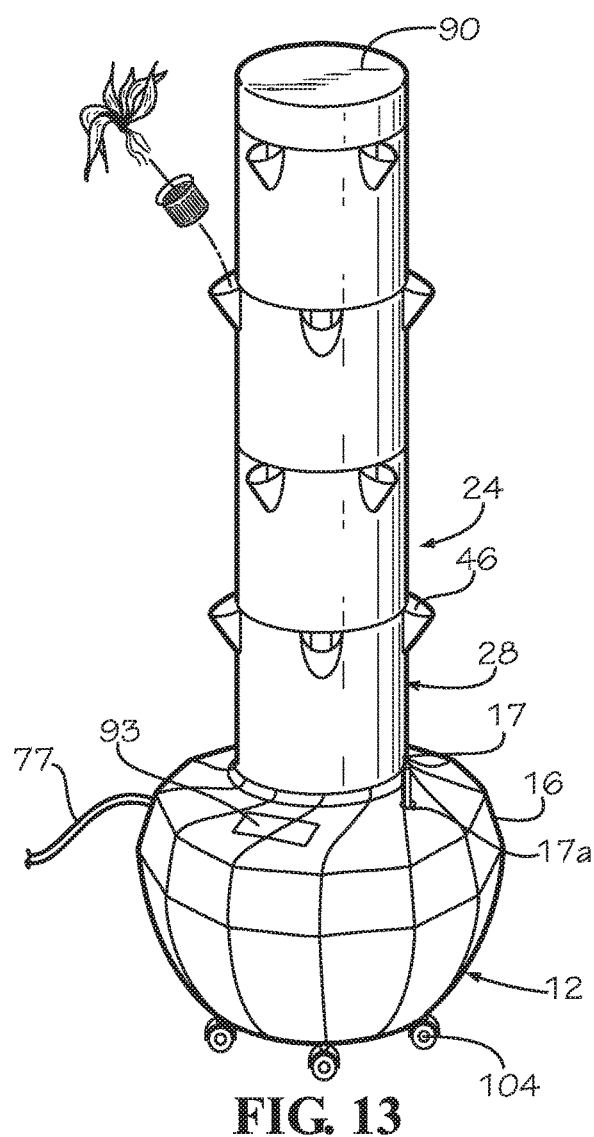
FIGS. 13-22 show various views of additional embodiments of a hydroponic plant cultivation system.
Figure 15:
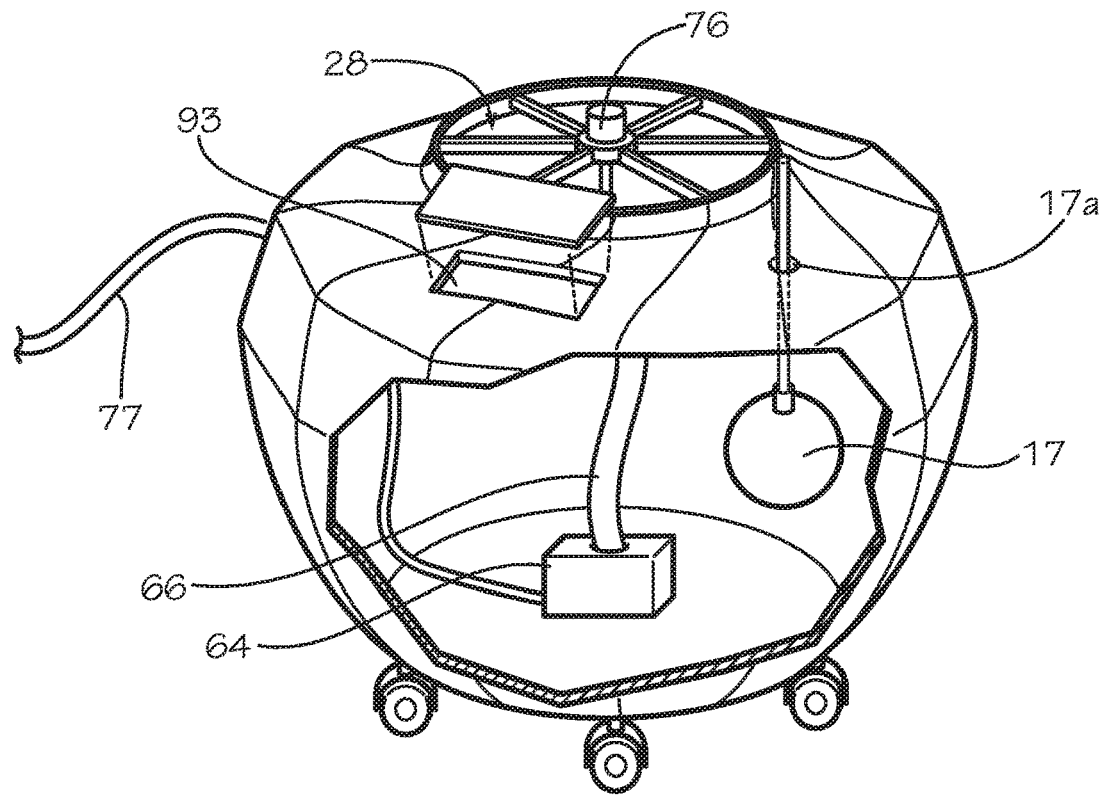
Figure 16:
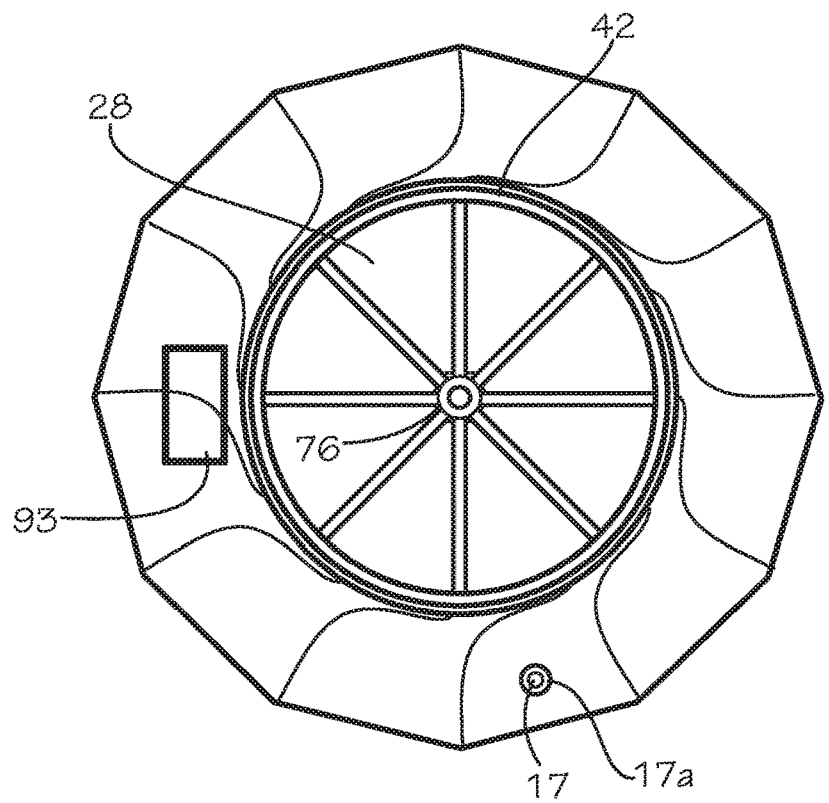
Figure 22:
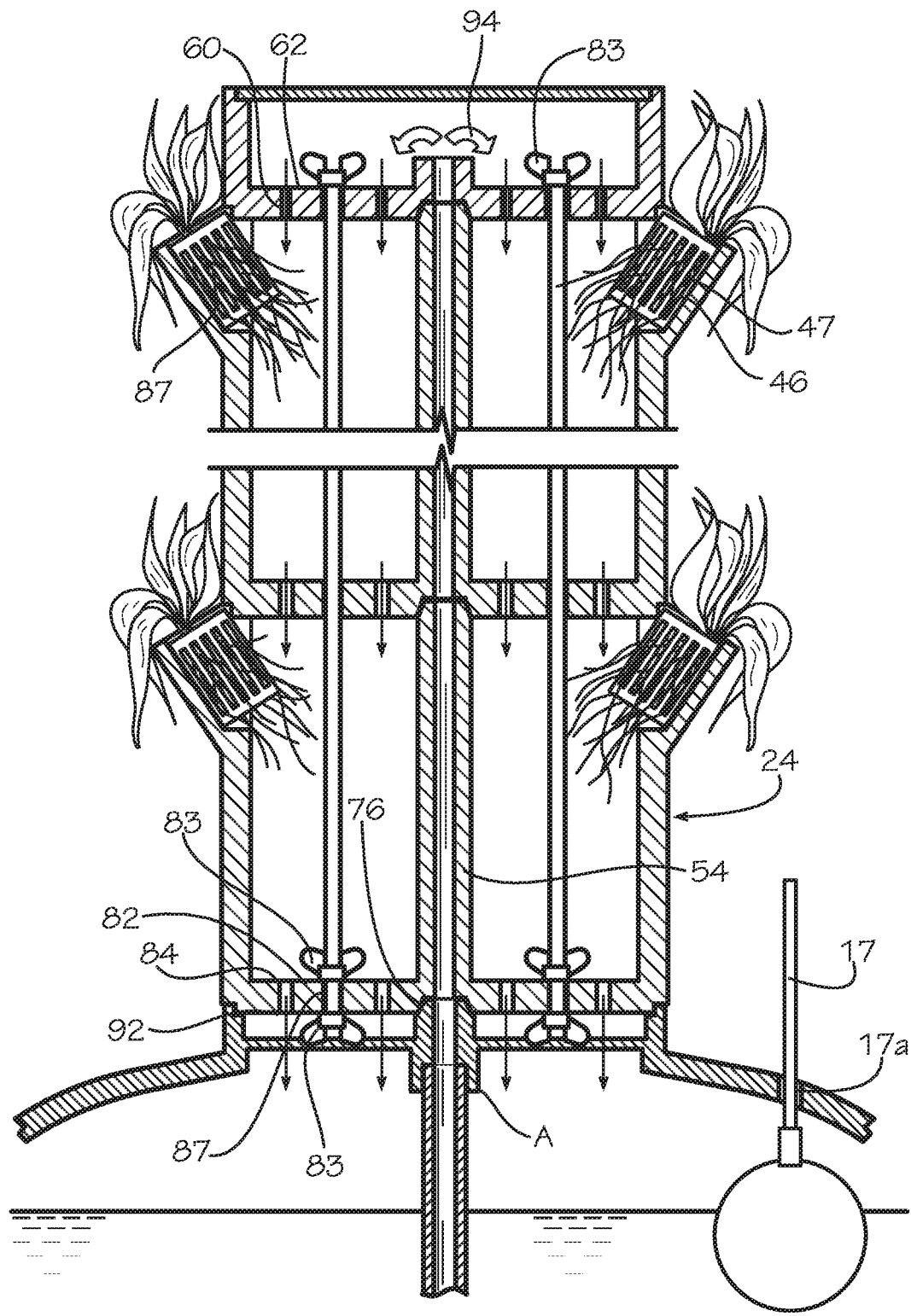

In some embodiments, a fill gauge 17 can extend through cover 16 and into reservoir 12, fill gauge 17 indicating the level of nutrient rich water inside reservoir 12. In some embodiments, as shown in FIGS. 15 and 22, fill gauge 17 can be a float with an upward extending rod. The upward extending rod can extend through a hole 17a in cover 16, the rod of fill gauge 17 being movable up and down through the hole 17a in the cover 16, such that as the water level in reservoir 12 changes, the amount which the rod of fill gauge 17 extends out of cover 16 can vary accordingly. As such, fill gauge can be visible from the exterior of reservoir 12. In some embodiments, the rod on fill gauge 17 can include color markings which can visually indicate the level of nutrient rich water in reservoir 12 and whether nutrient rich water should be added in reservoir 12. Therefore, the fill gauge allows a user to readily ascertain the water level of reservoir 12 and whether reservoir 12 needs to be refilled. In some embodiments, as shown in FIG. 13, cover 16 can also include access port lid 93 which can be lifted to allow a user to look inside reservoir 12 to inspect the water level inside reservoir 12.

Referring again to FIGS. 1-4, cover 16 can include an upper opening 28. Cover 16 extending upward from base 14 can allow upper opening 28 in cover 16 to be vertically offset from top edge 22 of base 14 as compared to conventional hydroponic systems with flat covers. In some embodiments, cover 16 can have a variety of shapes, including but not limited to, square prism, rectangular prism, conical, pyramidal, domed, hemi-spherical, etc., each shape allowing for an upper opening 28 to be vertically offset from a top edge 22 of base 14.

A planting column 24 can be positioned above upper opening 28. Planting column 24 can have a hollow interior, and at least one planting port 46 can be defined in planting column 24. Planting port 46 can be configured to receive plants at least partially into the hollow interior of planting column 24. During operation of the apparatus 10, nutrient rich water is supply through planting column 24 such that water can contact the roots of plants located in the hollow interior of planting column 24, and plants can subsequently grow out of planting port 46. In some embodiments, planting port 46 can be oriented at an angle relative to planting column 24 such that planting port 46 has a lower wall that is generally oriented at an upward angle, which can facilitate the insertion of plants into planting port 46 as well as encourage plants to grow upward and out of planting column 24. In some embodiments the orientation angle of panting port 46 is between 30 and 60 degrees with respect to an outer wall of planting column 24.

In some embodiments, a seed basket 47, shown in FIG. 1 and FIGS. 10-12, can be positioned in each of planting ports 46 in planting column 24. Seed baskets 47 can be used to hold a seed for a plant. Seed baskets 47 can have multiple openings which can allow roots of the plants in planting ports 46 to pass through seed baskets 47 and into planting column 24 where they can receive nutrient rich water, seed baskets 47 also directing the plants themselves out of planting ports 46. As such, seed baskets 47 can help prevent plants from becoming trapped inside planting column 24 while still allowing the roots of the plants to receive nutrient rich water.

In some embodiments, base 14, cover 16, and planting column 24 can be made of a heat-resistant material such as a resin material, such that the heat resistant material can help maintain a constant temperature profile within the plant cultivation system 10, which can help produce more consistent and efficient plant growth. In some embodiments, the resin material can be polystyrene. Heat resistant resins such as polystyrene can provide beneficial thermal properties, while also providing shock-resistant and light weight characteristics.

It may be necessary to remove cover 16 and planting column 24 from base 14 on occasion. Having cover 16 extending upward from base 14 and an upper opening 28 vertically offset from upper edge 22 of base 14 can allow cover 16 and planting column 24 to be separated from base 14 and placed on the ground, with upper opening 28 being vertically offset from the ground allowing water to drain from planting column 24 through upper opening 28, to help prevent water in planting column 24 from oversaturating the plants.

In some embodiments, as shown in FIG. 2, cover 16 can generally be described as extending upward from the base 14 at an acute angle 30 with respect to a vertical axis 32 of base 14 toward upper opening 28. Cover 16 in some embodiments can arch or extend upward from base 14 and have rounded walls 26, cover 16 and rounded walls 26 converging to upper opening 28 in cover 16. In some embodiments, cover 16 can extend upward arcuately from base 14, such that cover 16 can have a bowed, arched, curved, or rounded shape. In embodiments where cover 16 arches upward from base 14, angle 30 formed between respective tangent lines 34 of cover 16 and vertical axis 32 can vary along cover 16, such that cover 16 can generally be described as extending at an acute angle 30 with respect to vertical axis 32 toward upper opening 28, though the acute angle at which cover 16 is extending toward upper opening 28 may be changing along cover 16. In other embodiments, cover 16 can have substantially straight walls that extend at a consistent acute angle with respect to vertical axis 32, for instance when cover 16 has a conical or pyramidal shape.

Figure 3:
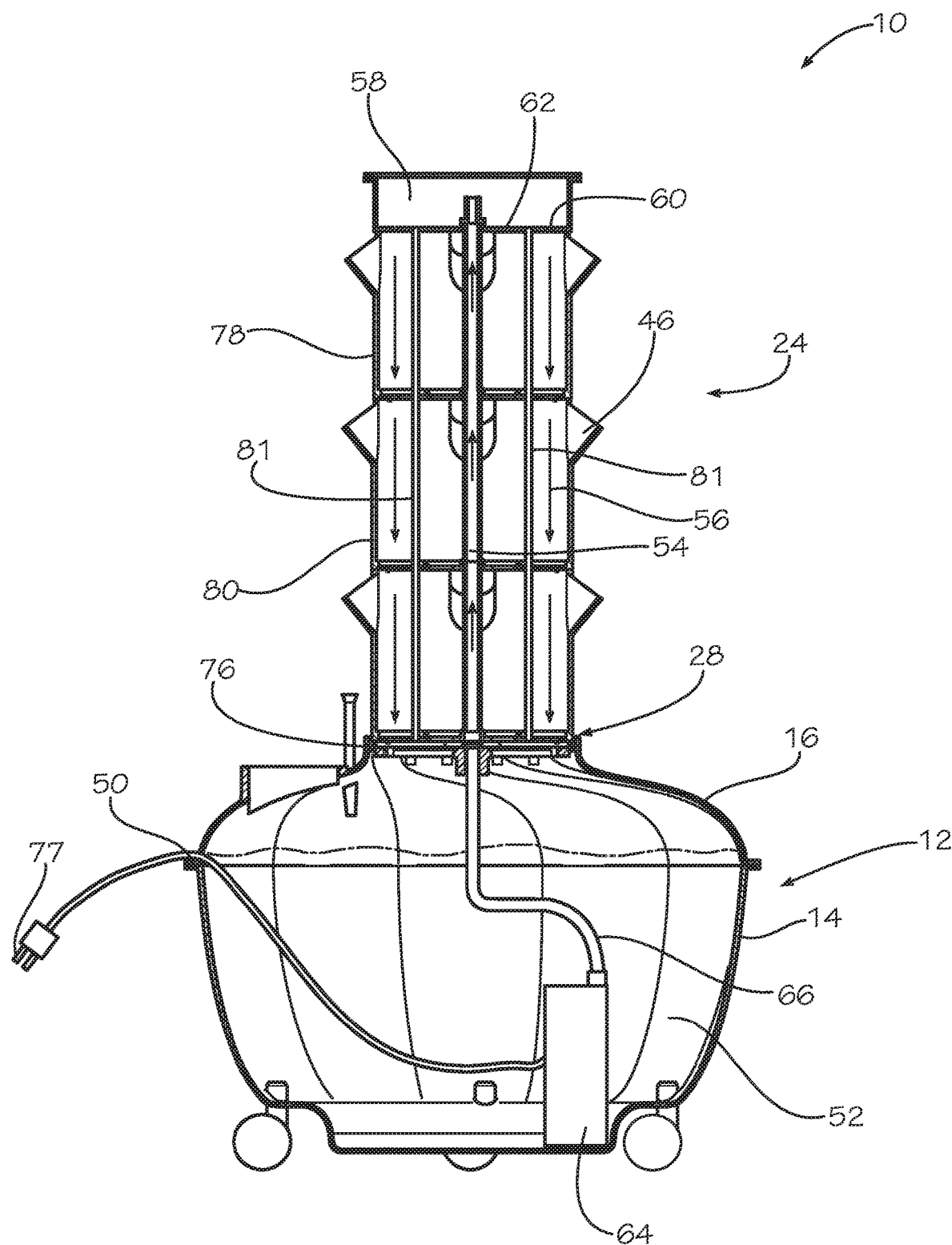
FIG. 3 is a cross section view of the hydroponic cultivation apparatus of FIG. 1.

In some embodiments, cover 16 can have a substantially domed or rounded shape, the domed cover 16 converging to upper opening 28. In some embodiments, as shown in FIG. 2, cover 16 can have an S-shaped cross section 36 forming a compound curve, the cross section 26 generally revolvable around vertical axis 32 to form cover 16. In such embodiments, cross section 36 can have an inflection point 38 where the concavity of cross section 36 changes. As such, cover 16 can include an inflexion inflection line 40, shown in FIG. 1, and in some embodiments, cover 16 can extend upward arcuately from base 14 with a downward concavity, and cover 16 can change concavities across inflection line 40 as cover 16 converges to upper opening 28. Cover 17 changing to an upward concavity as cover 16 converges to upper opening 28 can form an upward extension portion 42 that defines upper opening 28, as shown in FIG. 2. Upward extension portion 42 can also provide a vertical seat for planting column 44 to be nested in, as shown in FIG. 3.

Figure 12:
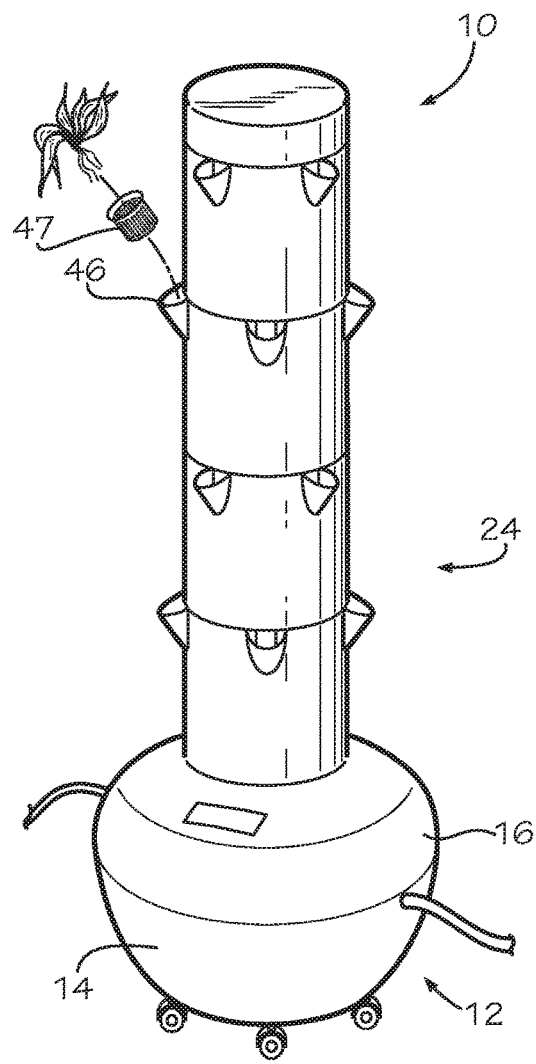
FIG. 12 is a perspective view of another embodiment of a hydroponic plant cultivation system having a generally spherical reservoir.

In some embodiments, as shown in FIG. 2, base 14 can have sidewalls 48 that extend arcuately in a downward direction from cover 16. Sidewalls 48 can also extend arcuately inward from a lower edge 50 of cover 16. As such, base 14 and cover 16 in some embodiments can form a reservoir 12 having a generally spherical shape, as shown in FIG. 1 and FIG. 12. Nutrient rich water 52 being stored in reservoir 12 can have an optimal storage temperature. Having a reservoir 12 with a generally spherical shape can help ensure that the temperature of water 52 stored in reservoir 12 can maintain an even temperature distribution, as a spherical reservoir can help optimize thermal dissipation within the reservoir.

One problem with conventional hydroponic plant cultivation systems is that the reservoirs in such systems are generally square or rectangular. As such, hot or cold spots can develop in the corners of the reservoir. If the hot or cold spots fall outside of an optimal storage temperature range for the nutrient rich water, the efficacy and useful life of the nutrients located in those hot spots can be adversely affected, which can inhibit plant growth with the system. Having a generally spherical reservoir can help eliminate hot or cold spots within the reservoir and help keep all of the nutrient rich water 52 in reservoir 12 at an optimal storage temperature.

During the operation of apparatus 10, a space between cover 16 and nutrient rich water 52 can become humid, which can cause moisture to form on the underside of cover 16. Another potential benefit of having a cover 16 that arches upward from base 14 or has a domed shape is that any moisture forming on the underside of cover 16 within reservoir 12 can be urged downward along cover 16 and back into nutrient rich water supply 52, as shown in FIG. 2.

In conventional hydroponic systems with flat covers, moisture would remain on the underside of the flat covers and can eventually cause mold to grow on the underside of the covers. Mold in the reservoir can adversely affect the quality of the nutrient rich water supply and the growth of plants within the system. The growth of mold can also require the reservoir to be cleaned more frequently, which would require the operation of the apparatus to be interrupted, and therefore plant growth would be adversely affected. The urging of moisture on cover 16, which arches upward from base 14, downward and into the water supply 52 can help reduce the growth of mold, which can help reduce cleaning time and down time for apparatus 10.

A cross section view of FIG. 1 is shown in FIG. 3. A conduit 54 can pass through hollow interior 56 of planting column 24. Conduit 54 can be fluidly communicated with reservoir 12. A fluid distributor 58 can be positioned atop planting column 24, fluid distributor 58 fluidly communicated with conduit 54. Fluid distributor 58 can include a lower wall 62 having a plurality of dispersion holes 60 such that water entering into fluid distributor 58 can disperse into planting column 24 and onto plants contained with hollow interior 56 of planting column 24 through dispersion holes 60. As such, nutrient rich water 52 can be circulated from reservoir 12 through conduit 54 in planting column 24 to fluid distributor 58, where the water can be redirected by fluid distributor 58 downward through dispersion holes 60, down hollow interior 56 of planting column 24, and back into reservoir 12 through upper opening 28.

As shown in FIG. 3, a pump 64 can be positioned in reservoir 12. A supply line or hose 66 can extend from pump 64 to conduit 54 of planting column 24. As such, pump 64 can force nutrient rich water from reservoir 12 into conduit 54 to the top of planting column 24. In some embodiments, cover 16 can include a fluid coupler 76 which can effectively couple supply line 66 to conduit 54, such that fluid coupler can act as a sealing jacket between supply line 66 and conduit 54. In some embodiments, fluid coupler 76 can include a swivel bearing or other feature that allows supply line 66 to rotate with respect to coupler 76 such that if planting column 24 or cover 16 were to rotate, supply line wouldn't twist and potentially kink. As such, supply line 66 can include a swivel hose.

In other embodiments, the supply line 66 can extend from the pump 64 to a splitter. A second supply line can extend from the splitter to a swivel connector to direct water upward into conduit 54. A drain line can also be provided from the splitter, the drain line including a removable plug. The drain line can extend out of reservoir 12. With the plug positioned on the drain line, pump 64 can direct water through the second supply line into conduit 54 during normal operation of apparatus 10. With the plug removed, pump 64 can force water through the drain line such that water 52 can be drained from reservoir 12 when desired.

A power cord 77 can extend from pump 64. Power cord 77 can be plugged into a power grid in order to provide power to pump 64 and hydroponic planting apparatus 10. In some embodiments, lower edge 50 can include a notch that can receive power cord 77 such that power cord 77 can pass through cover 16 while cover 16 can be seated properly on base 14. In some embodiments, pump 64 can run continuously as power is supplied to pump 64. In other embodiments, pump 64 can include a timer such that pump 64 can be programmed to operate at predetermined intervals. A timer for pump 64 can allow apparatus 10 to operate while being unattended.

Figure 8:
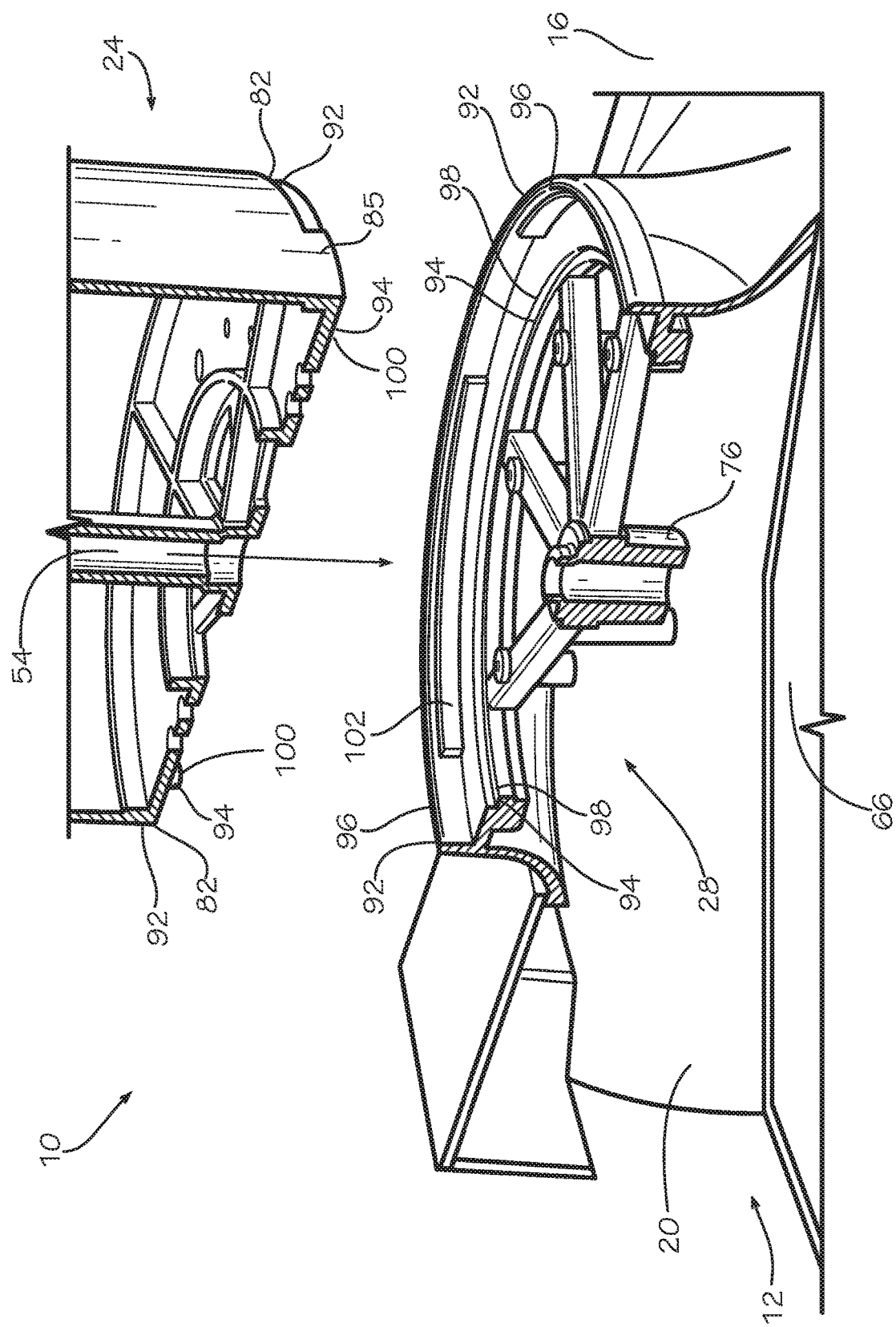
FIG. 8 is a partial cross section view of the hydroponic plant cultivation apparatus of FIG. 1 showing the connection between the planting column and the reservoir.

In some embodiments, as shown in FIG. 8, cover 16 can include a fluid coupler 76 positioned in upper opening 28. Fluid coupler 76 can be configured to fluidly couple supply line 66 and conduit 54 together when planting column 24 is positioned on or above upper opening 28, fluid coupler 76 acting as a sealing jacket for the junction between conduit 54 and supply line 66. Because cover 16 extends or arches upward from the base of reservoir 12, fluid coupler 76 can extend downward from upper opening into second portion 20 of reservoir 12. In conventional hydroponic systems with flat covers, such a fluid coupler could not extend below the upper opening in the cover because if the cover was optionally removed from the base and placed on the ground, the coupler would hit the ground and potentially crack or break, which would adversely affect the integrity of the seal between the conduit and the fluid supply line.

Upward extending or arching cover 16 allows fluid coupler 76 to extend down into second portion 20 of reservoir 12 without the risk of fluid coupler 76 cracking or breaking when cover 16 is optionally placed on the ground during cleaning, maintenance, etc. As such, cover 16 can include a significantly longer fluid coupler 76 than those in the prior art, which can produce a better sealing jacket for the junction between conduit 54 and supply line 66. A better seal can increase the efficiency of water being pumped through conduit 54 to the fluid distributor.

Figure 4:
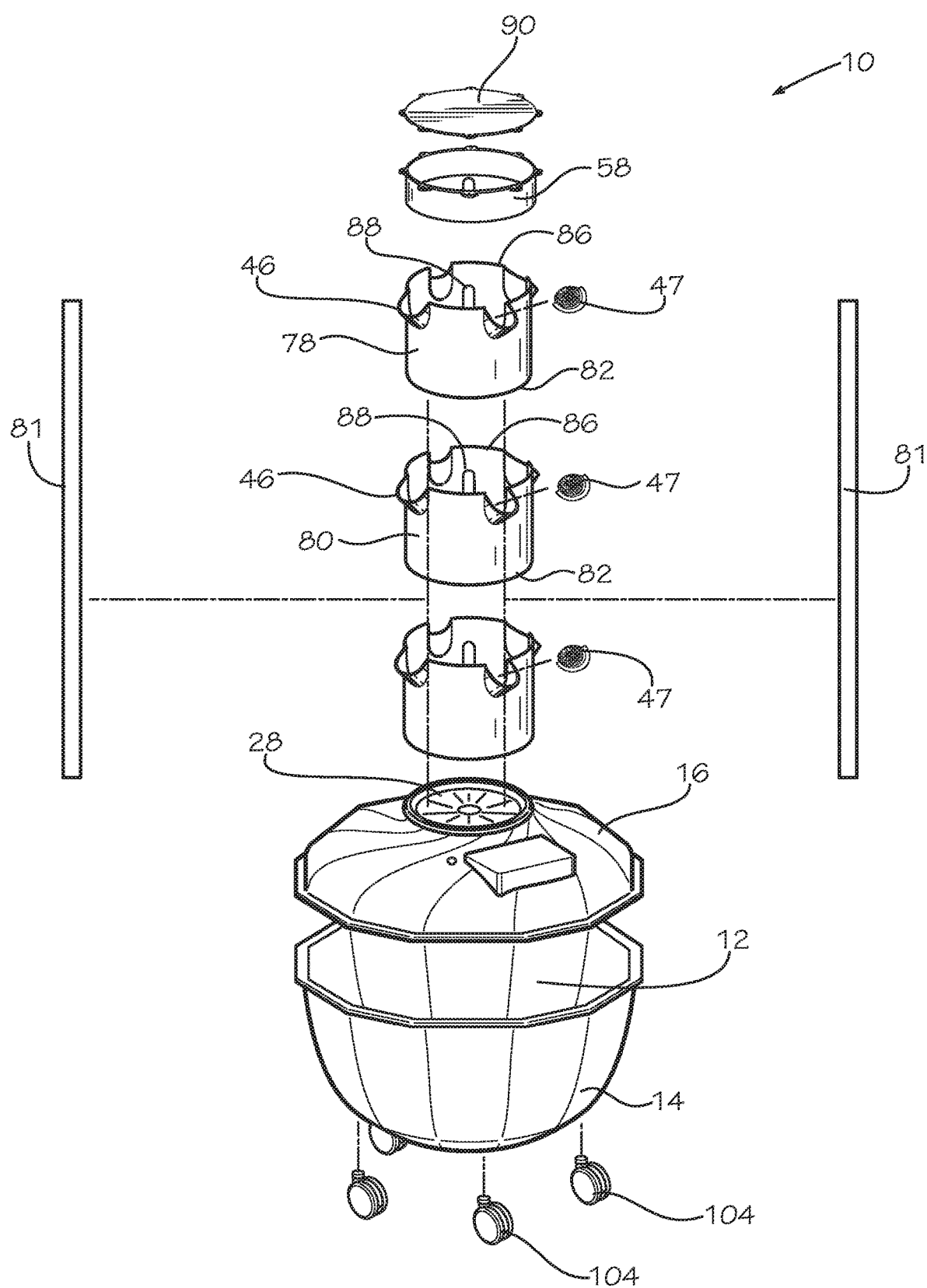
FIG. 4 is a an exploded view of the hydroponic cultivation apparatus of FIG. 1.
Figure 5:
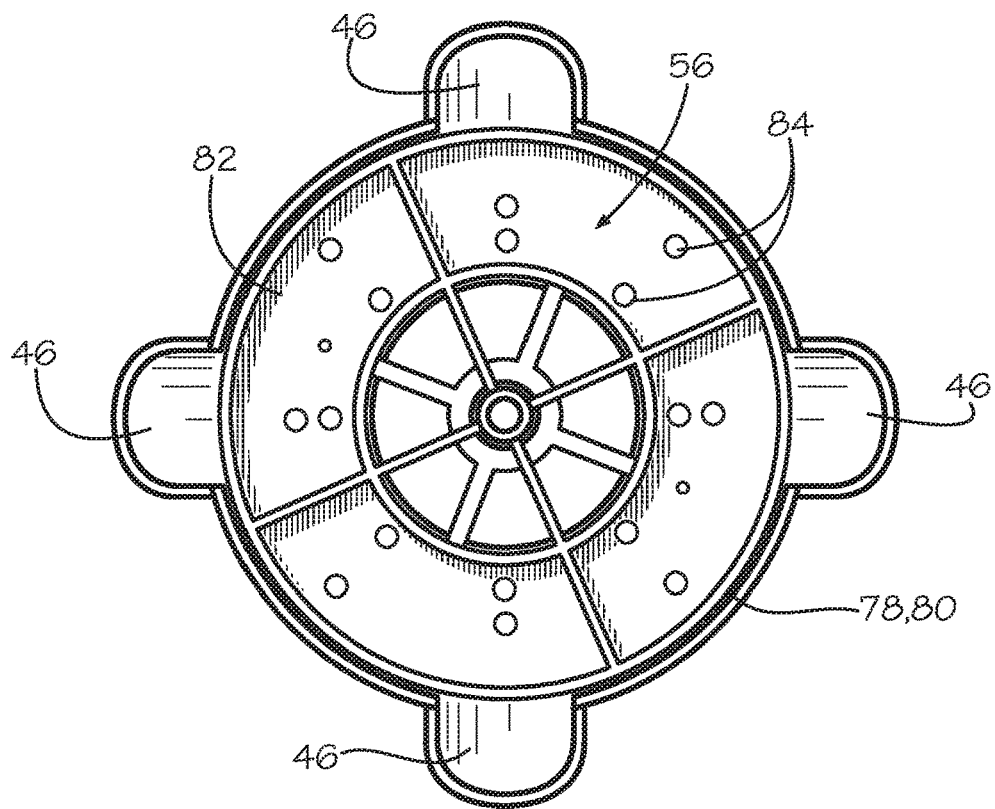
FIG. 5 is a top view of a module for a planting column of the hydroponic plant cultivation apparatus of FIG. 1.
Figure 6:
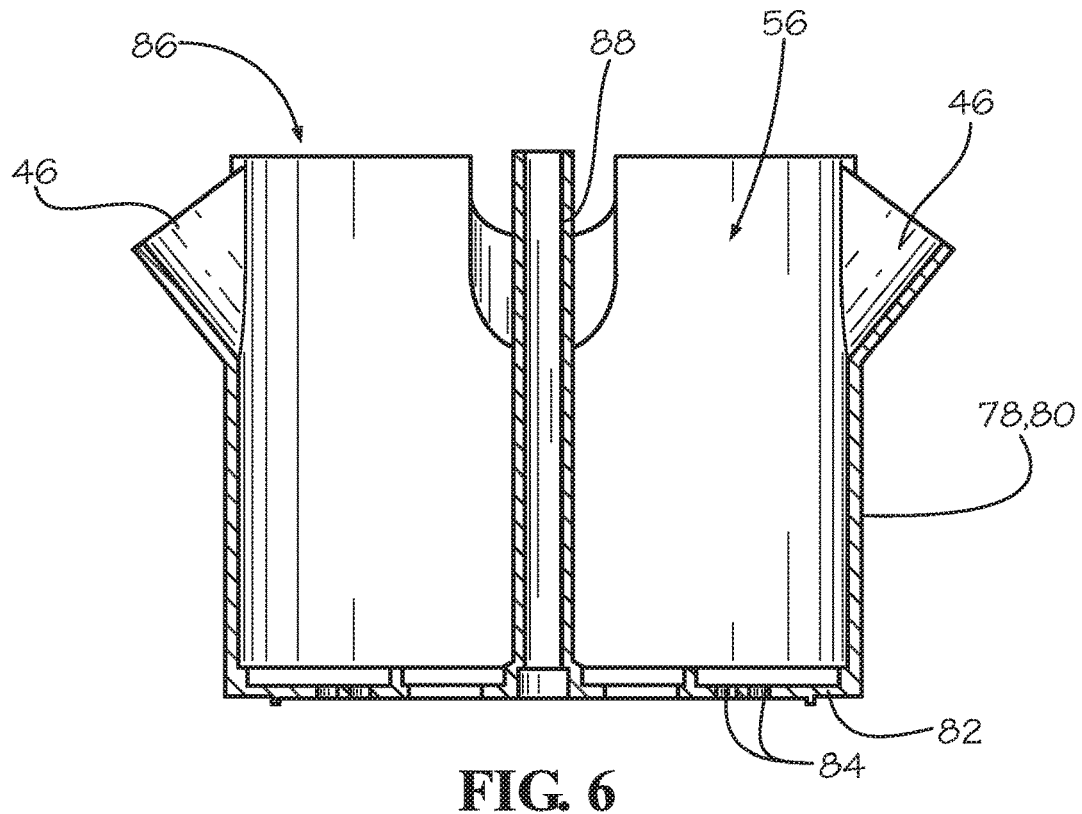
FIG. 6 is a cross section view of the module of FIG. 5.

An exploded view of apparatus 10 of FIG. 1 is shown in FIG. 4. In some embodiments, planting column 24 can include at least a first module 78 and a second module 80. As shown in FIGS. 5 and 6, each module 78 and 80 can include a hollow interior 56, a bottom wall 82 including a plurality of drain holes 84, and an open top end 86. Each module 78 and 80 can include at least one planting port 46 configured to at least partially receive plants into hollow interior 56 of modules 78 and 80. In some embodiments, modules 78 and 80 can include four planting ports 46, one planting port 46 located on each side of modules 78 and 80. As such, plants can grow out of all four sides of modules 78 and 80.

Figure 9:
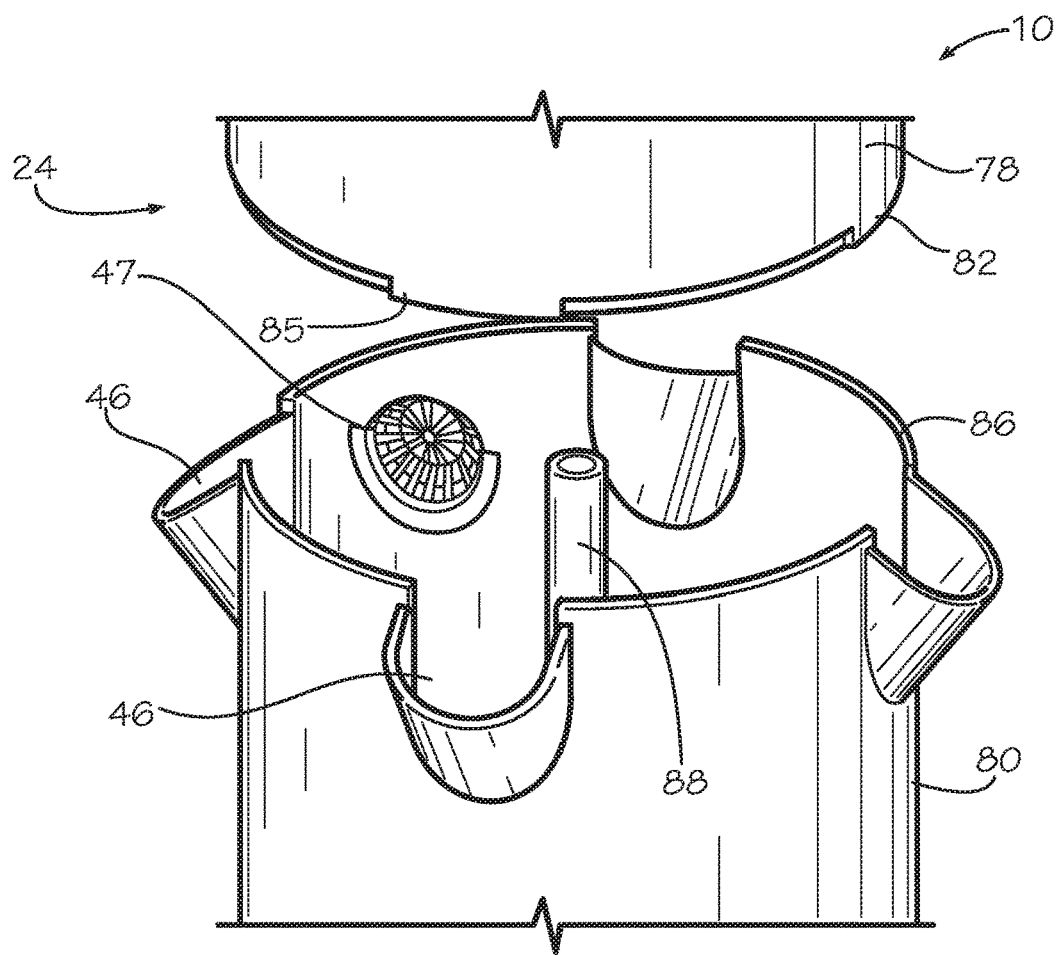
FIG. 9 is a detailed view of the coupling of two modules in the planting column of the hydroponic plant cultivation apparatus of FIG. 1.
Figure 10:
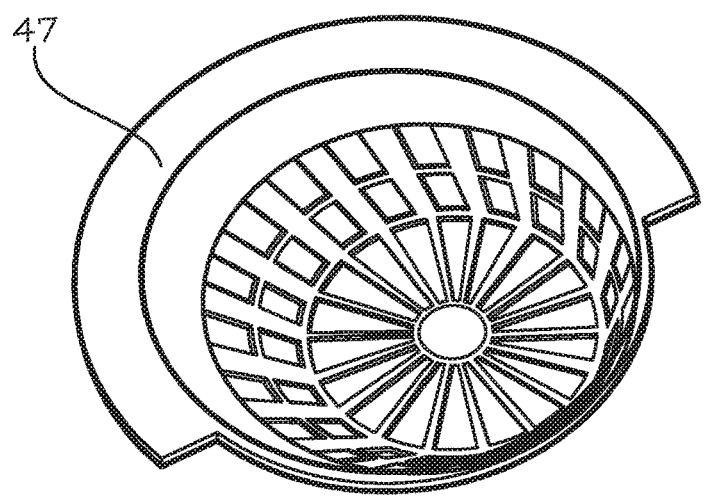
FIG. 10 is a perspective view of an embodiment of a seed basket of the present invention.
Figure 11:
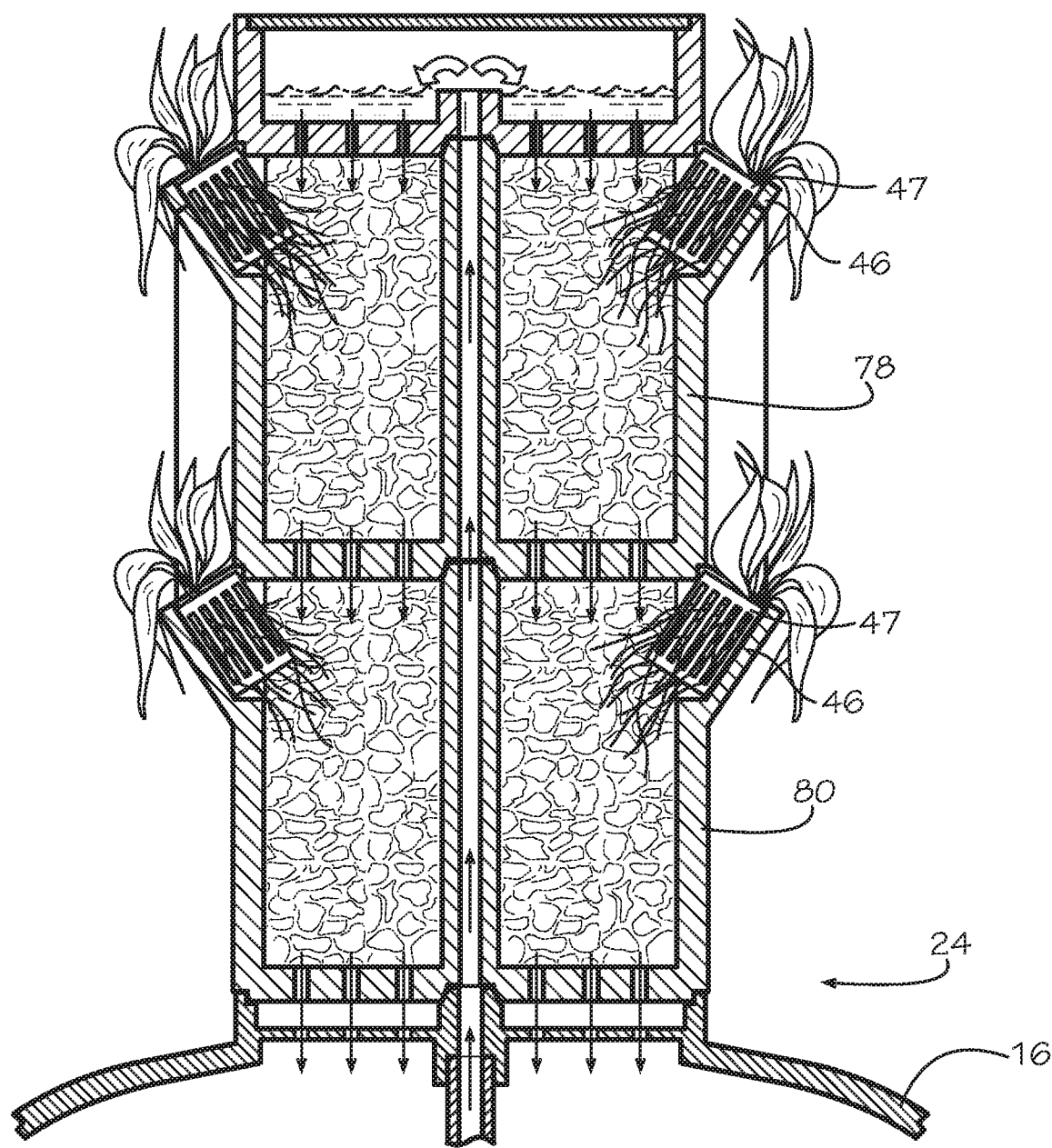
FIG. 11 is a cross section view of the seed basket of FIG. 10 inserted into a module of a hydroponic plant cultivation apparatus.

As can be seen from FIG. 9, bottom wall 82 of first module 78 can be configured to engage top open end 86 of second module 80, such that first and second modules 78 and 80 can be stacked in an end to end configuration to form at least part of planting column 24. In some embodiments, bottom wall 82 of modules 78 and 80 can include multiple protrusions 85 which can align with plant ports 46 located in top open end 86 of modules 78 and 80, such that when one module is placed on another, protrusions 85 slide into planting ports 46 to engage bottom wall 82 with top open end 86. In some embodiments, protrusions 85 and planting ports 46 can act as corresponding angular stop elements on bottom wall 82 and top open end 86, the angular stop elements preventing relative rotation between first and second modules 78 and 80 when the modules are stacked on one another and bottom wall 82 engages top open end 86.

In some embodiments, as shown in FIG. 3 and FIG. 4, planting column 24 can include one or more support rods 81 that extend through holes in modules 78 and 80. Support rods 81 can be configured to extend through each module in planting column 24 such that support rods 81 help provide structural integrity to planting column 24 and prevent the modules from falling apart or moving relative to one another. Support rods 81 can be made from any suitable material, including stainless steel in some embodiments.

Figure 14:
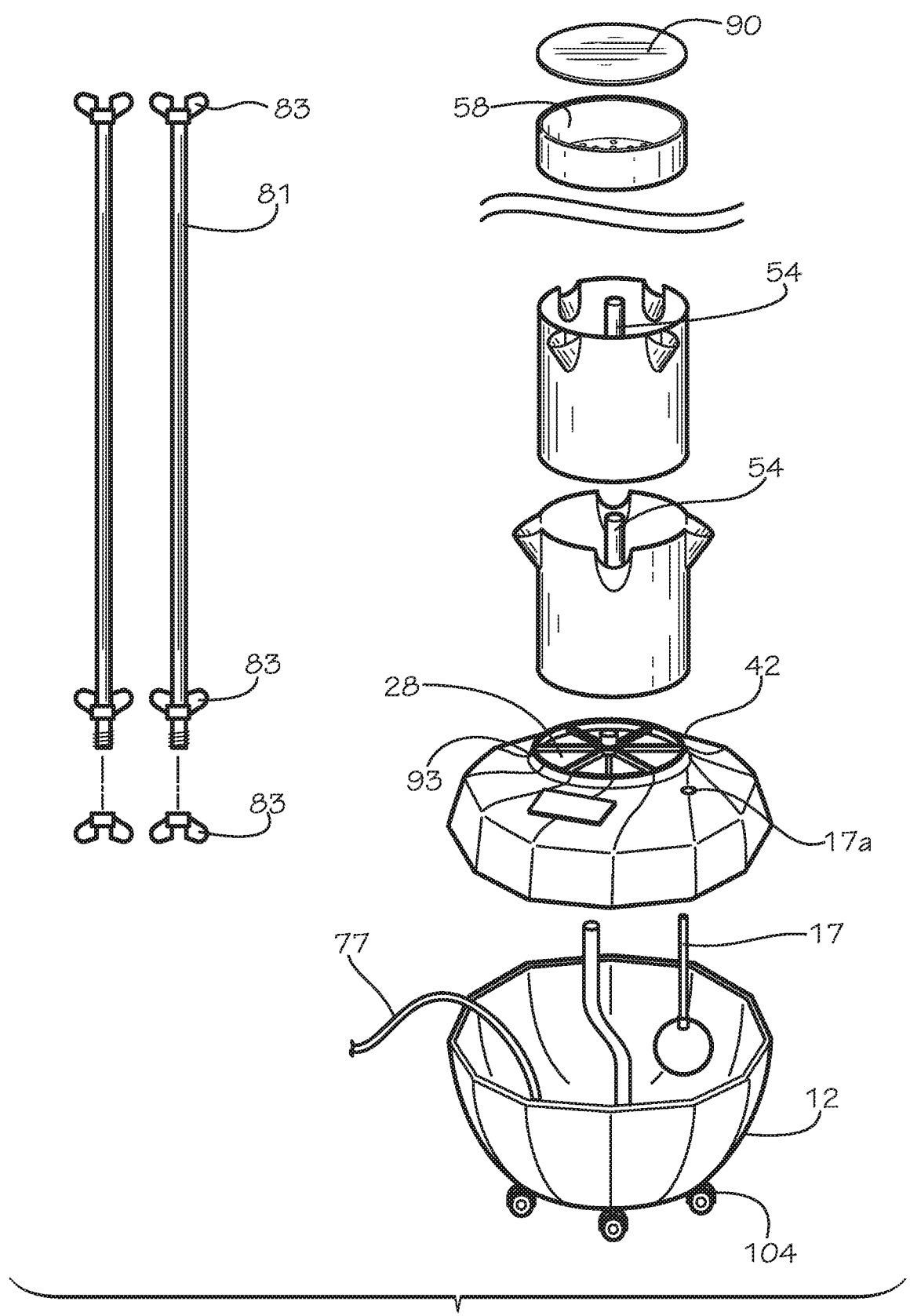
Figure 19:
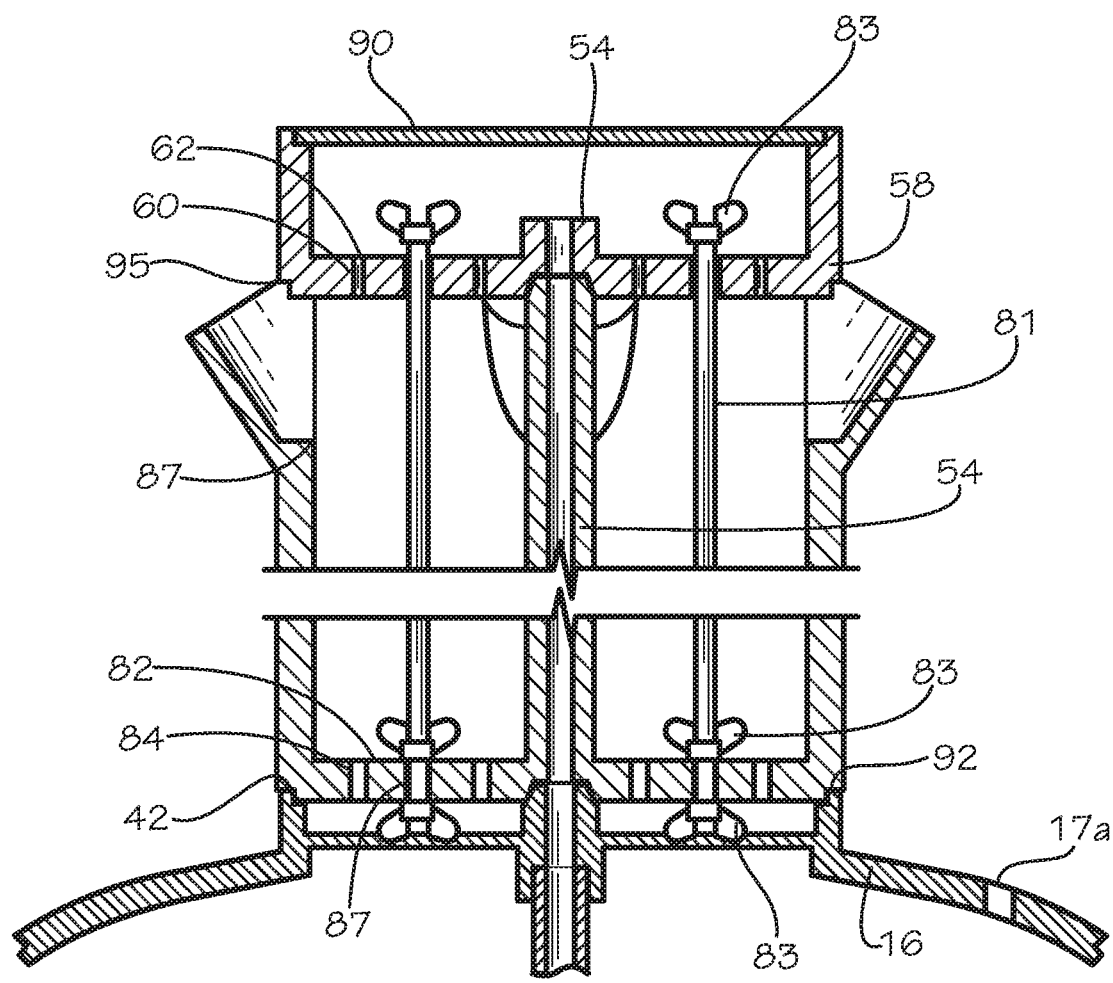

As can be seen in FIGS. 14 and 19, in some embodiments, the apparatus 10 can include a plurality of nuts 83 which can be used to secure support rods 81 in position through support column 24 and fluid distributor 58. A nut 83 can be inserted onto support rod 81 and support rod 81 can then be inserted through support column 24 until the nut 83 abuts bottom wall 82 of the lowest module in support column 24. In some embodiments, an additional nut 83 can be positioned on the opposite side of bottom wall 82 of the lowest module in support column 24 such that support rod 81 is secured in position relative to the lowest module in support column 24. Additional modules can then be positioned on support column 24 by sliding the modules down onto support rods 81 such that the modules are linearly engaged together. Fluid distributor 58 can then be positioned on top of support column 24 with support rods 81 further extending through fluid distributor 58. A nut 83 can then be positioned on support rod 81 above a lower wall 62 of fluid distributor 58, such that support column 24 and fluid distributor 58 can be rigidly connected together and supported by support rod 81. In embodiments with more than one support rod 81, the above procedure can be repeated for each rod 81.

Figure 7:
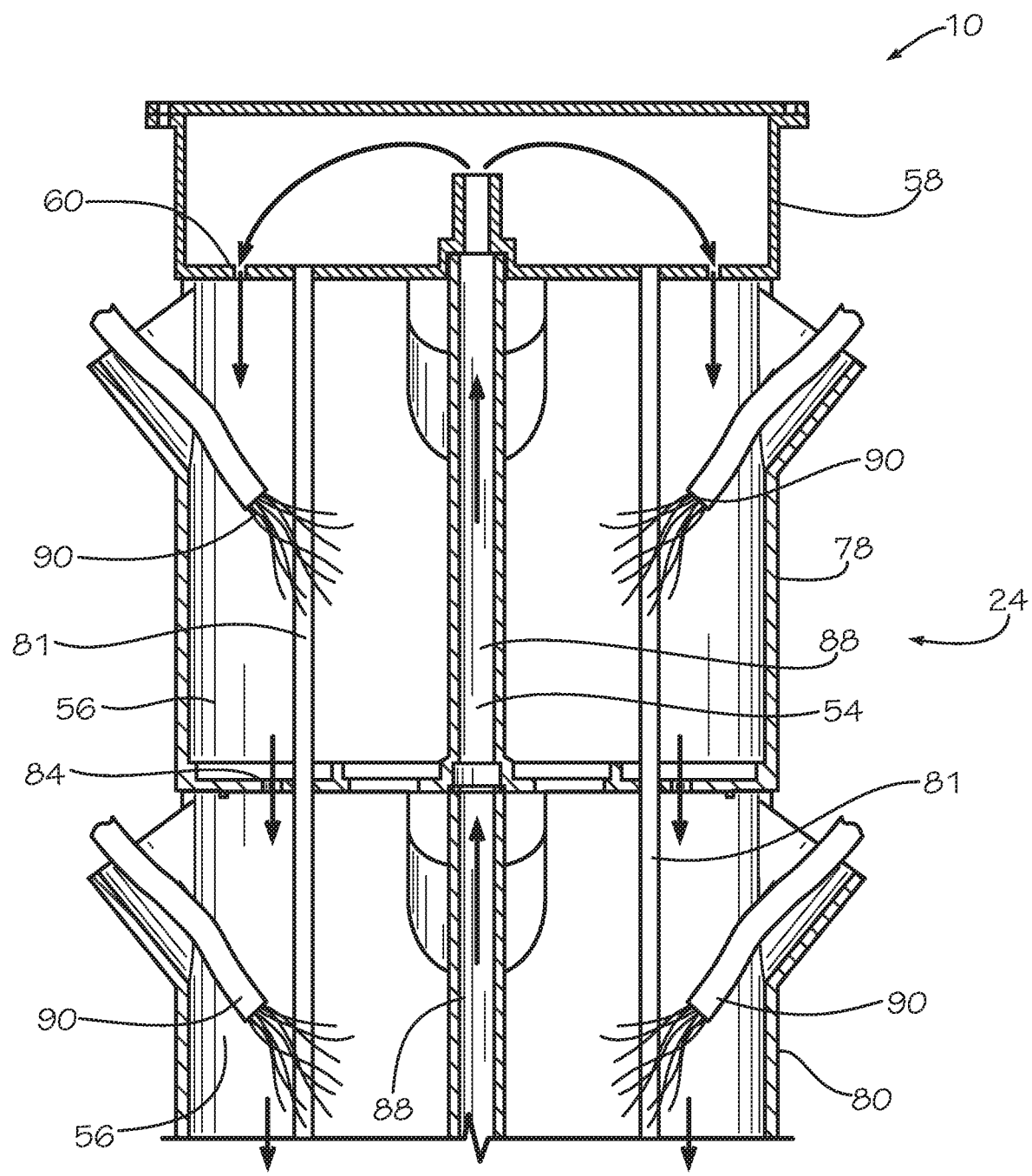
FIG. 7 is a partial cross section view of the hydroponic plant cultivation apparatus of FIG. 1 showing the flow of water up a conduit and into the hollow space of the planting column onto plants.

Referring to FIGS. 6 and 7, each of modules 78 and 80 can have a module conduit 88 extending from bottom wall 82 to top open end 86. Module conduit 88 can be configured to engage module conduits 88 on adjacent modules, such that module conduit 88 on first module 78 can engage module conduit 88 on second module 80. The engagement of multiple module conduits 88 can form the overall conduit 54 that extends through planting column 24. Modules 78 and 80 can therefore be interchangeably stacked on top of one another to form planting column 24 such that as plants grow from modules 78 and 80, modules 78 and 80 can be reorganized and restacked if needed to reduce crowding or interference of the plants extending from planting column 24. Additional modules can also be readily added to planting column 24 to increase the amount of plants that can be grown in planting column 24.

With first and second modules 78 and 80 stacked on top of one another, a continuous conduit 54 can extend through support column 24. Fluid distributor 58 can be positioned atop first module 78 and fluid distributor 58 can be in fluid communication with conduit 54. As water is pumped from the reservoir up conduit 54 to fluid distributor 58, water can be collected in fluid distributor 58 and exit fluid distributor 58 through dispersing holes 60 into planting column 24 and hollow interior 56 of modules 78 and 80. Fluid distributor 58 can have a top plate 90 that can redirected water entering fluid distributor 58 downward and ensure the water exits through dispensing holes 60. Water can pass between modules 78 and 80 and any other modules in planting column 24 by passing through dispensing holes 84 in bottom wall 82 of each of the modules until the water returns to the reservoir. As the water enters each module, the water can drip on the roots 90 of plants received in hollow interior 56 of each module 78 and 80, thereby promoting growth of the plants. In some embodiments, hollow interior 56 can include a planting medium, including but not limited to, air, rock wool, or any other suitable planting medium that can alleviate the need for soil.

In some embodiments, as shown in FIG. 8, the upper opening 28 and the planting column 24 can have a first pair of corresponding nesting elements 92, as well as a second pair of nesting elements 94. In some embodiments, the upper opening can include a first lip 96. A bottom wall 82 of planting column 24, or a bottom wall 82 of the lowest module in planting column 24, can be configured to nest inside first lip 96 of the upper opening, such that planting column 24 can nest inside upper opening 28. Additionally, upper opening 28 can include a second lip or groove 98, and the bottom wall 82 of planting column 24 can further include an annular rib 100 that can be configured to nest within second lip or groove 98. As such, planting column 24 and upper opening 28 can include two pairs of nesting elements 92 and 94 that can provide an improved seating of planting column 24 on upper opening 28. Nesting elements 92 and 94 can also help prevent lateral movement of planting column 24 relative to upper opening 28, which can help maintain the integrity of the seals through conduit 54 as apparatus 10 is in use. In some embodiments, first lip 96 can include upper opening angular stops 102 that can engage protrusions 85 extending from bottom wall 82 of planting column 24 or the lowest module of planting column 24. As such, rotation of planting column 24 relative to upper opening 28 can be prevented by angular stops 102. In still further embodiments, a friction or interference fit can be formed between one or more nesting elements 92 and 94 on support column 24 and upper opening 28 of over 16 can help provide an even more secure engagement between support column and cover 16.

Additionally, as shown in FIG. 19, fluid distributor 58 and support column 24 can include a third set of nesting elements 95, which can include a step defined in lower wall 62 of fluid distributor 58. The step in the lower wall 62 of fluid distributor 58 can nest on the top open end 86 of the upper most module in support column 24 such that fluid distributor 58 can be nested on support column 24. In somne embodiments, third nesting elements 95 can also form an interference or friction fit between fluid distributor 58 and support column 24 to provide a better engagement between fluid distributor 58 and support column 24.

Another problem with conventional hydroponic systems is that they can be difficult to move or transport, especially with water remaining in the reservoir. Conventional reservoirs have flat bottoms that rest on the ground. To move a conventional system the entire system has to be lifted and move to the new location. If water is present in the reservoir, the system can be increasingly heavy, which can require the water to be drain before the system is moved, thereby wasting nutrient rich water. Additionally, if the system is moved with any water in the reservoir, the water has the potential to shift during transport and spill out of the reservoir, wasting nutrients and also causing a mess for the operator to clean up.

To help alleviate this problem, some embodiments of apparatus 10 can include a plurality of rollers 104 connected to reservoir 12, as shown in FIG. 1. Reservoir 12 can be positioned on rollers 104 such that the weight of apparatus 10 is carried by rollers 104. As such, when an operator desires to move apparatus 10, the operator can easily roll apparatus 10 via rollers 104 to the new location without having to lift the potentially heavy apparatus 10, and without having to drain water out of reservoir 12. In some embodiments, an annular indention 106 can be defined in the bottom of reservoir 12, annular indention 106 configured to receive rollers 104, as shown in FIG. 2. In other embodiments, a separate recess can be defined in the bottom of reservoir 12 for each roller 104. In some embodiments, rollers 104 can be figured to snap fit into reservoir 12 such that rollers 104 can be quickly assembled onto reservoir 12. Additionally, in some embodiments, rollers 104 can be equipped with one or more stoppers or adjustable locks which can be actuated to prevent rollers 104 and apparatus 10 from moving unintentionally.

An additional benefit of rollers 104 is that reservoir 12 can sit off of the ground. As such, a bottom wall 108 of reservoir 12 is not required to support the weight of apparatus 10 when rollers 104 are attached to reservoir. As such, a diameter of bottom wall 108 can be smaller to accommodate the inward curving sidewalls 48 of base 14. In some embodiments, bottom wall 108 of reservoir 12 can be rounded to further provide reservoir 12 with a spherical shape to help optimize thermal dissipation and thermal continuity within reservoir 12.

Figure 17:
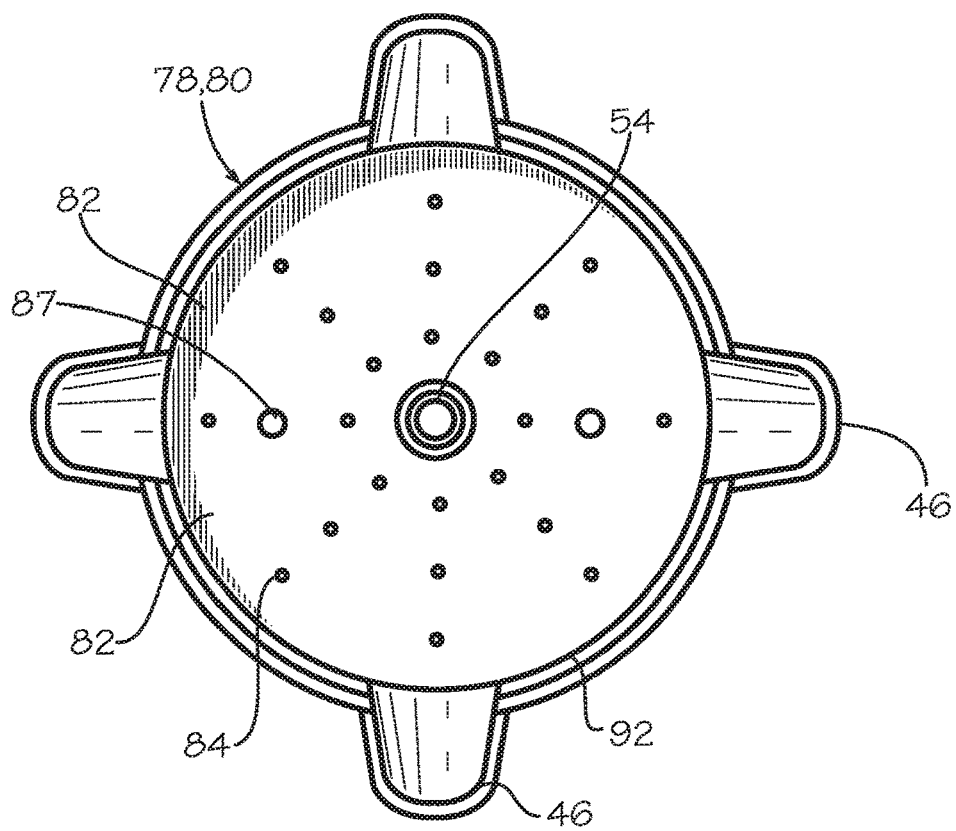
Figure 18:
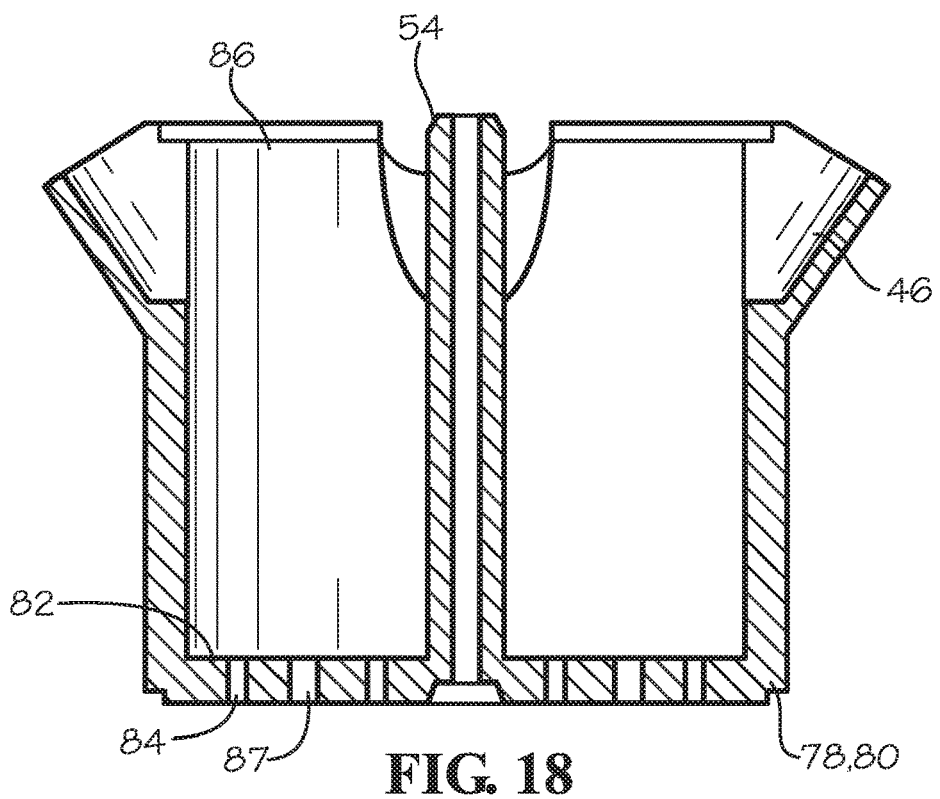

As can be seen from FIG. 17, in some embodiments, lines of drain holes 84 can be defined in bottom wall 82 of modules 78, 80, the lines extending radially from conduit 54. In some embodiments, modules 78 and 80 can include 8 lines of drain holes 84 extending radially from conduit 54, with each line containing 3 drain holes 84. In some embodiments, one or more rod holes 87 can be defined in bottom wall 82 of modules 78 and 80, the rod holes 87 being sized to allow a support rod to extend through rod holes 87 and the support column.

Figure 20:
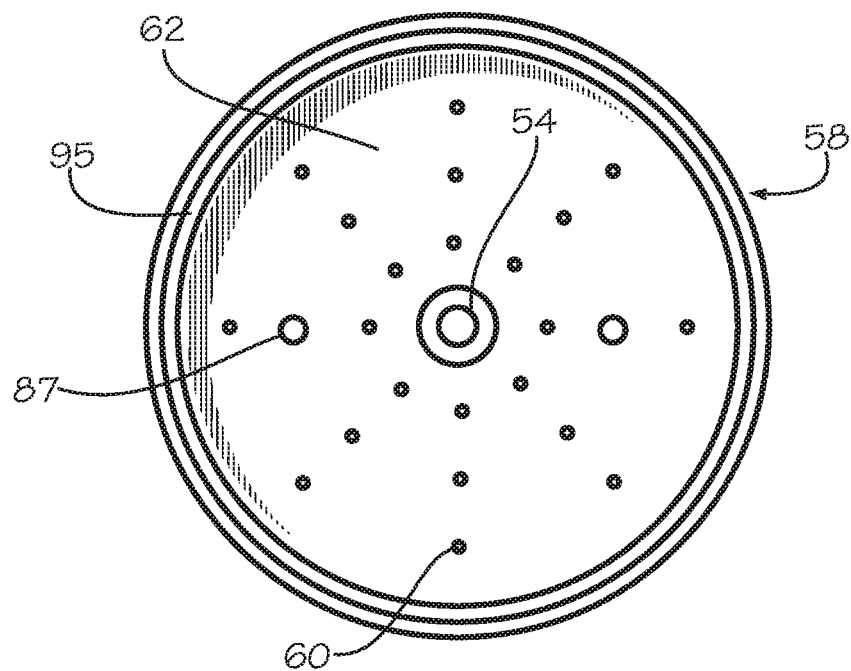
Figure 21:
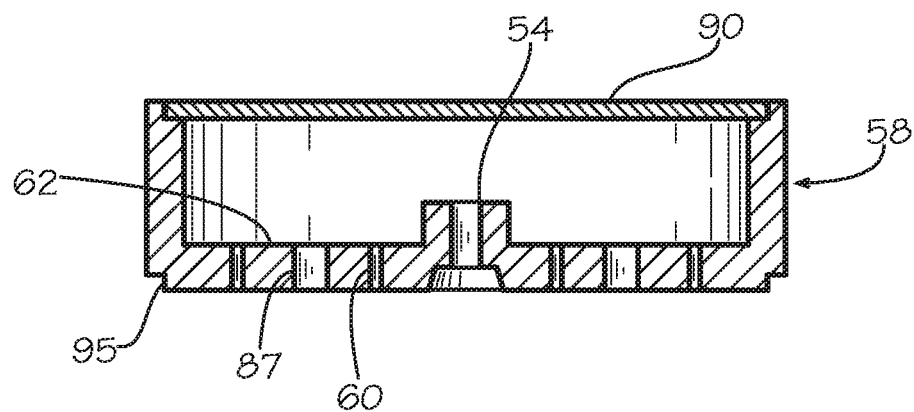

Similarly, as can be seen from FIG. 20, in some embodiments, lines of dispersing holes 60 can be defined in lower wall 62 of fluid distributor 58, the lines extending radially from conduit 54. In some embodiments, fluid distributor 58 can include 8 lines of dispersing holes 60 extending radially from conduit 54, with each line containing 3 dispersing holes 60. In some embodiments, one or more rod holes 87 can be defined in lower wall 62 of fluid distributor 58, the rod holes 87 being sized to allow a support rod to extend through rod holes 87 and fluid distributor 58.

In some embodiments, when fluid distributor 58 is positioned over support column 24, as shown in 22, support holes 85 in the modules of support column 24 can be aligned with rod holes 87 in fluid distributor 58 such that a support road 81 can extend through support column 24 and fluid distributor 58. In such embodiments, drain holes 84 in the modules of support column 24 and the dispersing holes 60 in fluid distributor can be substantially aligned, such that nutrient rich water passing through apparatus 10 generally flows downward in a straight lines.

In some embodiments, as can be seen in FIG. 22 dispersing holes 60 can have a smaller diameter than the diameter of drain holes 84. It can be desirable for a certain amount of nutrient rich water or tonic to be contained in fluid distributor 58, the nutrient rich water then being periodically be dispersed through dispersion holes 60. As such, dispersing holes 60 having a generally small diameter can allow nutrient rich water to build up in fluid distributor 60. As nutrient rich water in fluid distributor 58 reaches a certain level, pressure created by the weight of the built up nutrient rich water can then force water to be dispersed through dispersion holes 60 evenly. If dispersing holes 60 had a diameter that was too large, then nutrient rich water would not be retained in fluid distributor 58 and nutrient rich water would potentially not disperse through dispersion holes 60, and therefore apparatus 10, evenly, which could negatively affect the growth of plants contained within apparatus 10.

If drain holes 84 in the various modules of the support column 24 are too small, then nutrient rich water could be retained and stored in one module, which could produce a shortage of water in other lower modules. As such, drain holes 84 in some embodiments can be sized to generally allow uninhibited flow of nutrient rich water through the modules and the support column 24. As such, the drain holes 84 having a larger diameter than the diameter of dispersing holes 60 can allow fluid to be built up in fluid distributor 58 such that fluid can be evenly distributed through the apparatus 10, while simultaneously allowing fluid to flow through all modules of support column 24 freely, once the fluid passes through dispersing holes 60. In some embodiments, the diameter of the dispersing holes 60 can be about 3 mm, and the diameter of the drain holes 84 can be about 6 mm.

Thus, although there have been described particular embodiments of the present invention of a new and useful Improved Hydroponic Plant Cultivating Apparatus, it is not intended that such references be construed as limitations upon the scope of this invention.

What is claimed is:

1. A hydroponic plant cultivation apparatus comprising:
a reservoir for holding fluid;
a plurality of rollers, the reservoir positioned on the plurality of rollers;
a plurality of planting modules stacked atop one another in an end to end configuration above the reservoir, each module including a sidewall, a hollow interior, at least one planting port defined in the sidewall for receiving a plant at least partially into the hollow interior, an open top end, a bottom wall configured to releasably engage the open top end, a plurality of drain holes defined in the bottom wall, at least one protrusion extending from the bottom wall directly below the at least one planting port, the at least one protrusion of each module above the lowermost module in the stack engaging the at least one planting port of an underlying adjacent module to prevent relative rotation between adjacent modules and vertically align the at least one planting port of each module of the plurality, and a module conduit extending from the bottom wall to the open top end, each module conduit in fluid communication with the module conduit of each adjacent module to form a planting column conduit in fluid communication with the reservoir; and
a fluid distributor positioned atop the plurality of planting modules, the fluid distributor in fluid communication with the planting column conduit;
wherein fluid is selectively circulated from the reservoir through the planting column conduit to the fluid distributor, where the fluid is redirected down the hollow interior of each planting module and back to the reservoir.

2. The apparatus of claim 1, further comprising an annular indention defined in a bottom of the reservoir, the plurality of rollers configured to be received by the annular indention.

* * * * *